US007561926B2

(12) United States Patent
Garcia-Ortiz

(10) Patent No.: US 7,561,926 B2
(45) Date of Patent: Jul. 14, 2009

(54) APPARATUS FOR MONITORING AND CONTROLLING AN ISOLATION SHELTER AND PROVIDING DIAGNOSTIC AND PROGNOSTIC INFORMATION

(75) Inventor: Asdrubal Garcia-Ortiz, Chesterfield, MO (US)

(73) Assignee: Drs Sustainment Systems, Inc., St. Louis, MO (US)

( * ) Notice: Subject to any disclaimer, the term of this patent is extended or adjusted under 35 U.S.C. 154(b) by 0 days.

(21) Appl. No.: 10/917,583

(22) Filed: Aug. 13, 2004

(65) Prior Publication Data

US 2005/0049753 A1 Mar. 3, 2005

Related U.S. Application Data

(60) Provisional application No. 60/494,834, filed on Aug. 13, 2003.

(51) Int. Cl.
*G05B 15/02* (2006.01)
*G05B 11/01* (2006.01)
*G05B 19/18* (2006.01)
*G05B 9/02* (2006.01)
*G06F 17/00* (2006.01)

(52) U.S. Cl. ............................ 700/9; 700/10; 700/17; 700/19; 700/20; 700/21; 700/65; 700/79; 700/90

(58) Field of Classification Search ............... 700/9, 700/10, 12, 17, 19–21, 65, 79, 90, 275, 83
See application file for complete search history.

(56) References Cited

U.S. PATENT DOCUMENTS 5,732,510 A 3/1998 Sutton et al.
6,574,515 B1 * 6/2003 Kirkpatrick et al. ........... 700/19
6,796,896 B2 9/2004 Laiti
6,985,779 B2 * 1/2006 Hsiung et al. ................ 700/19
7,251,535 B2 * 7/2007 Farchmin et al. ............. 700/26

(Continued)

FOREIGN PATENT DOCUMENTS

EP 0 467 257 A2 7/1991

(Continued)

OTHER PUBLICATIONS

Weil, Roark; Diagnostics & Prognostics for a Collective Protection Shelter System; Jan. 28, 2003; http://nsc.natick.army.mil/jocotas/ColPro_Papers/Weil2.pdf; pp. 1-5.*

(Continued)

*Primary Examiner*—Albert DeCady
*Assistant Examiner*—Jennifer L Norton
(74) *Attorney, Agent, or Firm*—Sonnenschein Nath & Rosenthal LLP

(57) ABSTRACT

Monitoring and controlling apparatus and related methods for use with collective protection shelters or other isolation environments utilizing one or more digital processors to monitor and control the operation of the shelter. The apparatus affords shelter design and functional growth flexibility, along with diagnostic and prognostic capability, including condition based maintenance, interactive electronic manuals, and access to systems for replacement parts requisition. Further, the physical and functional expandability of the apparatus affords easy incorporation of shelter design changes, user interface design changes, and sensor design changes as well as improved functional and operational flexibility. The system also decreases volume and weight over prior designs.

44 Claims, 4 Drawing Sheets

U.S. PATENT DOCUMENTS

| | | | |
|---|---|---|---|
| 7,317,968 B2* | 1/2008 | Lorton et al. | 700/275 |
| 2002/0104323 A1 | 8/2002 | Rash et al. | |
| 2002/0161940 A1* | 10/2002 | Eryurek et al. | 710/15 |
| 2003/0045946 A1* | 3/2003 | Hattori et al. | 700/27 |
| 2003/0055666 A1* | 3/2003 | Roddy et al. | 705/1 |
| 2005/0033466 A1* | 2/2005 | Eryurek et al. | 700/108 |
| 2006/0178764 A1* | 8/2006 | Bieswanger et al. | 700/89 |

FOREIGN PATENT DOCUMENTS

| | | |
|---|---|---|
| EP | 1 148 456 A1 | 5/2000 |

OTHER PUBLICATIONS

Garcia-Ortiz, Asdrubal, Springer, Allen, Wootton, John R.; Incorporating Digital Processors into Collective Protection Shelter Systems—An Architecture, Its Synthesis, and the Benefits Derived; Jan. 16, 2003; http://nsc.natick.army.mil/jocotas/ColPro_Papers/Garcia-Ortiz.pdf; pp. 1-9.* http://www.fas.org/man/dod-101/sys/land/cbps.htm, (2000).*

Chemically and Biologically Protected Shelter System (CBPSS), SBCCOM Online, http://www.sbccom.army.mil/products/shelters/cbps.htm.

O'Hern, M.R., Dashiell, T.R., and Tracy, M.F., Chemical Defense Equipment, in Medical Aspects of chemical and Biological Welfare, Ch. 16, http://chemdef.apgea.army.mil/textbook/Ch-16.pdf.

Greitzer, F. L. and Pawlowski, R.A., Embedded Prognostics Health Monitoring, International Instrumentation Symposium, May 2002.

Roemer, M.J. and Kacprzynski, G.J., Advanced Diagnostic and Prognostics for Gas Turbine Engine Risk Assessment, IGTI/ASME Turbo Expo, Germany, May 2000.

Greitzer, F.L. and Ferryman, T.A., Predicting Remaining Life of Mechanical Systems, Intelligent Ship Symposium IV, Apr. 2-3, 2001.

Frith, P. and Karvounis, G., Model-Based Decision Support Tools for T700 Engine Health Monitoring. DSTO International Coppnference on Health and Usage Monitoring, Melbourne, Australia, Feb. 19-20, 2001.

Brotherton, T.W., Chadderdon, G. and Grabill, P., Automated Rule Extraction for Engine Vibration Analysis, 1999 IEEE Arteospace Conference, Aspen, CO Mar. 1999.

Brotherton, T.W. and Chadderdon, G., Automated Rule Extraction for Engine Health Monitoring, 7th Annual conference on Evolutionary Programming, San Diego, CA, Mar. 25-27, 1998.

Adams, D.E., Smart Diagnostics, Prognostics, and Sellf-Healing in Next-Generation Structures, Motion Systems Magazine, Apr. 2001.

* cited by examiner

APPARATUS FOR MONITORING AND CONTROLLING AN ISOLATION SHELTER AND PROVIDING DIAGNOSTIC AND PROGNOSTIC INFORMATION

CROSS REFERENCE TO RELATED APPLICATION(S)

This application claims priority to U.S. Provisional Application Ser. No. 60/494,834 filed Aug. 13, 2003, the entire disclosure of which is herein incorporated by reference.

BACKGROUND OF THE INVENTION (1) Field of the Invention

The present invention pertains to systems, apparatus, and methods for managing an isolation environment, such as those in a collective protection shelter, particularly to controllers that are adaptable in their scope of operation, and incorporate environmental and process sensors and diagnostic and prognostic algorithms to ensure the operational integrity of the isolation environment.

(2) Background of the Invention

In recent years the need to protect individuals from dangerous substances in the air has become one of increasing interest. All human beings must breath and the introduction of harmful airborne agents into the air they inhale creates a dangerous situation whereby individuals can be injured or even killed and which can strain the emergency response capability of a populated area. While all environmental air contains some impurities which can harm those breathing it, such as cold viruses and allergens, recent developments in conventional warfare and terrorism, have resulted in an increased likelihood of large scale contamination of air wherein venues that offer physical protection and sources of clean air are highly desirable to prevent catastrophic outcomes.

The danger of a nuclear, biological, chemical or radiological (NBCR) weapon being unleashed on military forces, or on civilian centers, is a nightmare scenario for many government organizations. Such an attack can stymie military effectiveness, or bring day to day economic activity to a grinding halt. Even without the purposeful use of nuclear, biological, chemical or radiological weapons, the possibility of industrial accidents involving such agents in populated areas is also a danger and governments must be able to respond to protect the citizenry.

Particularly in military or emergency situations where contamination occurs as the result of a purposeful attack, it is necessary that personnel be able to continue to carry out tasks such as military response, policing, and medical care even while the environment is contaminated. Further, scientific analysis and cleanup activities need to be performed to help clean the contaminated environment. Traditionally, when operating in a contaminated environment, personnel will utilize protective garments which allow them to act fairly autonomously to perform such tasks. In many situations, however, the task is inconsistent with the use of protective garments. For instance, delicate surgical activities can generally not be performed as the garments are too bulky to allow fine motor activities.

To prevent exposure to contaminants and provide for a location both where individuals can escape from the contaminants, and can perform tasks to which cumbersome protective garments are not well suited, an isolation environment, such as that inside a collective protection shelter, is generally used. A collective protection shelter is, in effect, a self-contained building having a supply of clean air and able to house multiple individuals which can carry on activities within the structure. So as to provide clean air, environmentally contaminated air is generally pulled into an air handling device, filtered to remove the contamination, and the clean air is pumped into the structure housing the individuals. The structure is simultaneously pressurized to seal it, thus preventing leaks from the outside environment.

Isolation environments may be permanent or may be temporary. In emergency responses or military field activities, a temporary structure is generally preferred as it can be quickly setup anywhere when needed, and more easily stored when not needed. Often the temporary structure is inflatable whereby the structure can be setup in the zone of contamination and can then be filled with clean air using a portable filtration system, some of the air being used to provide structural support. Inflatable structures are generally fairly easy to transport and erect, and they readily collapse when not in use.

While inflatable structures of this type can be very useful in military and emergency situations, they do require some level of effort to maintain in operation once erected. In particular, airflow into the structure must be maintained in order to maintain inflation. If air flow is insufficient, the structure can collapse or can draw in unfiltered external air which can contaminate the isolation environment. Those inside the structure need to be able to monitor the structure and the environmental control unit over time and perform any needed maintenance actions before a failure occurs which could result in the occupants being exposed to contaminants. Further, monitoring of the internal environment is necessary to keep the occupants comfortable and in a safe and usable environment.

There are generally two ways to deal with maintenance, the simplest is to simply wait for a failure, and then repair or replace the component which has failed. This is generally referred to as corrective maintenance (CM). While CM provides for the most cost effective use of components as no component is replaced before it has completely exhausted its useful life, it is generally not practicable in an isolation environment as the occurrence of failure may result in contamination and loss of the isolation environment.

Instead, in order to operate effectively, an isolation environment will need to be able to estimate when a component will fail, and replace it just prior to its failure to maintain the operational integrity of the isolation environment. This is commonly called preventive maintenance (PM). While effective PM can provide continuous safe operation of the collective protection shelter, it also imposes its own costs. Currently, there is no mechanism to determine the useful life remaining in components in a collective protection shelter other than simply the time they have been in use. Therefore, shelters use what is called time-based maintenance (TBM).

TBM relies on prior operational tests of components under particular conditions and determines when they are likely to fail. TBM then uses this time estimate to determine when maintenance should occur by simply setting the maintenance interval to be less than the time for the component to fail. In this way, the system should, theoretically, never fail as no device ever reaches the end of its useful life.

The problem with TBM, is that TBM does not take into account actual operational conditions which generally will affect the operational life of a component. For instance, a filter may remain in service for a period of time longer than TBM dictates if it has not had anything to actually filter out, or a motor may last longer if it has been run at a more optimized speed, rather than at a maximum speed. Further, TBM does not necessarily know if a particular component may be more prone to failure due to an error in construction, or to changing conditions. TBM can try to statistically accommodate such diversity, but often, it is simply not possible to have enough exemplars to either recognize or to cope with all possibilities.

Generally, therefore, protocol dictates that devices be maintained more frequently than may be needed to prevent any unanticipated failures. While this can usually prevent failure, often, these maintenance procedures entail risk themselves. Personnel may be required to leave the protected environment or temporarily shut off various components to perform the needed maintenance. Each of these represents an opportunity for unintended contamination. Therefore, while TBM is designed to minimize danger from failure, it opens up an avenue for danger from the practice of unnecessary maintenance. Further, for disposable goods, such as air filters, the TBM can impose additional costs. Replacing filters before required means that more filters are needed in storage to keep the shelter operational. As transport and provision of filters uses logistical resources which may be better used for different purposes, the inefficient use of disposables such as filters may be inadvertently wasting resources needed elsewhere.

In order to deal with the problems of TBM, it is desirable to instead utilize condition-based maintenance (CBM). In CBM the condition of the device is directly monitored, or various other conditions which may be indicative of the performance of a device are monitored. Both of these readings are generally taken over time. A failure rarely occurs suddenly, but a component will generally curve toward a failure over time until the condition finally crosses a threshold where failure occurs (or could occur at any time). With CBM, as the device approaches the threshold, maintenance is performed just in time. In this way, the actual expected failure based on the actual performance and current conditions is used, instead of the theoretical failure based purely on time.

CBM, while more efficient, particularly with regard to disposable goods, generally requires a mathematical analysis of historical events and trends in a measurement and significantly more data than TBM. The behavior of a device over time is generally much more indicative of future performance (and possible failure) than a behavior snapshot taken at any given point in time. For instance, a motor which has been exposed to many stops and starts is likely to need maintenance sooner than one which has been continuously running for the same time, even though both may show the same electrical current input measurement.

The current state of the art in the design of controllers for collective protection shelters is based on the use of electromechanical relays, diodes, pushbutton and rotary switches, and enunciators to monitor and control the operation of the shelter. The resulting system architecture is inherently inflexible to changes due to its hard-wired nature. It also does not offer the functionality needed to store and mathematically analyze data from multiple sensors, or present it in a variety of formats where a trend may be apparent. Finally, the designs are unable to provide diagnostic or prognostic data and are instead limited to a situational notification role. In particular, a series of alarms indicate that a particular situation has occurred and a series of controls allow the user to alter some facet of the operation without regard for each other.

Also, current controllers, due to their hard-wired nature, are designed to operate with specific sensors. If those sensors become obsolete, replacing them with better models may not be feasible or requires an enormous amount of work which does not allow for the rapid upgrade of the shelters as better sensors become available. The same holds true of upgrades to the power source used to operate the shelter, e.g., going from hydraulic power to electrical power.

SUMMARY OF THE INVENTION

Because of these and other problems in the art, described herein, among other things, are controllers and methods for monitoring and controlling the operation of an isolation environment, such as that inside a collective protection shelter. These systems and methods generally allow the mathematical manipulation of environmental and process sensor data, for the purpose of equipment condition diagnosis, fault detection, troubleshooting, trend analysis, and failure prognosis for purposes of maintenance. The controller also generally affords shelter design flexibility, programmability for easy incorporation of shelter operation changes, and expandability for easy incorporation of, among other things, new sensors, advanced user interfaces, power sources and air filtration equipment. The use of electronics also reduces the volume, weight and cost of the controller over existing systems and simplifies equipment maintenance and availability.

In an embodiment described herein is a controller for a shelter including an isolation environment, the controller comprising: a first processor; a shelter interface connected to the first processor, the interface being able to accept signals from a sensor, and deliver signals to an actuator; and a user interface connected to the first processor, the user interface being able to take in instructions from a user and display information; a communication link connected to the first processor for accessing material external to the controller; wherein the first processor uses the signals from the sensor and the instructions from the user to provide to the use the user interface the information, the information relating to the operation of a plurality of shelter components, the information being used by a user to ensure the integrity of the isolation environment; and wherein the first processor can generate the signals to the actuators based on the signals from the sensors and the instructions from the user.

In an embodiment, the controller includes a second processor which may be similar to the first processor and assumes some of the functions of the first processor or located physically remote from the first processor and is in communication with the first processor.

In an embodiment the controller the shelter is inflatable and may comprise a Chemically and Biologically Protected Shelter System (CBPSS).

In an embodiment of the controller the first processor is a programmable digital processor which includes a memory, which may be expandable, for program and data storage. The first processor may be programmed to store the signals from the sensor, maintenance data on at least one of the shelter components, or interactive electronic technical manuals on the operation and maintenance of the shelter in the memory.

In an embodiment of the controller, the first processor produces as the information trend information about the stored signals, diagnosis of the current state of at least one of the shelter components, or prognosis of the state of at least one of the shelter components by mathematically operating upon the stored signals.

In an embodiment of the controller, the information includes a fault ambiguity set generated by the first processor mathematically operating upon the stored maintenance data and the stored signals using probability theory, evidential reasoning, neural networks, or fuzzy set theory.

In an embodiment of the controller, the communication link may be either wired or wireless and can access a system for ordering replacement parts directly from a supply center, the Internet, a remote computer, or a remote piece of maintenance equipment.

In an embodiment of the controller, the signals from the sensor or to the actuator may include analog signals, digital signals, or discrete signals.

In an embodiment of the controller, the user interface may include any or all of switches and potentiometers, a touchscreen, a keyboard, a pointing device, visual and aural annunciators, or a graphical display such as a plasma display, a liquid crystal display, an electroluminescent display, a vacuum tube display, and a light emitting diode display.

In another embodiment, there is described herein a controller for a shelter including an isolation environment, the controller comprising: a processor; a plurality of actuators connected to the processor; a user interface connected to the processor; and a plurality of sensors connected to the processor; wherein the processor accepts input signals from the sensors, and delivers output signals to the actuators; wherein the processor mathematically manipulates the input signals to produce information about the current and future operation of the shelter; wherein the processor provides the user with the information through the user interface; wherein the processor takes in instructions from a user through the user interface; and wherein the processor generates the output signals based on the input signals and the instructions from the user.

In a still further embodiment, there is described herein a controller for a shelter, including an isolation environment, the controller comprising: at least two processors; a user interface; a plurality of actuators; and a plurality of sensors; wherein one of the processors accepts input signals from the sensors and delivers output signals to the actuators; wherein at least one of the processors mathematically manipulates the input signals to produce information about the current and future operation of the shelter; wherein at least one of the processors provides the user with the information through the user interface; wherein at least one of the processors takes in instructions from a user through the user interface; wherein at least one of the processors generates the output signals based on the input signals and the instruction from the user; and wherein two of the processors exchange data with each other via a communications channel.

In an embodiment of the controller with two processors, the communications channel may be wired or wireless and the at least one of the processors mathematically manipulating the input signals is physically remote from the at least one of the processors providing the user the information.

DETAILED DESCRIPTION OF THE PREFERRED EMBODIMENTS

Figure 1:
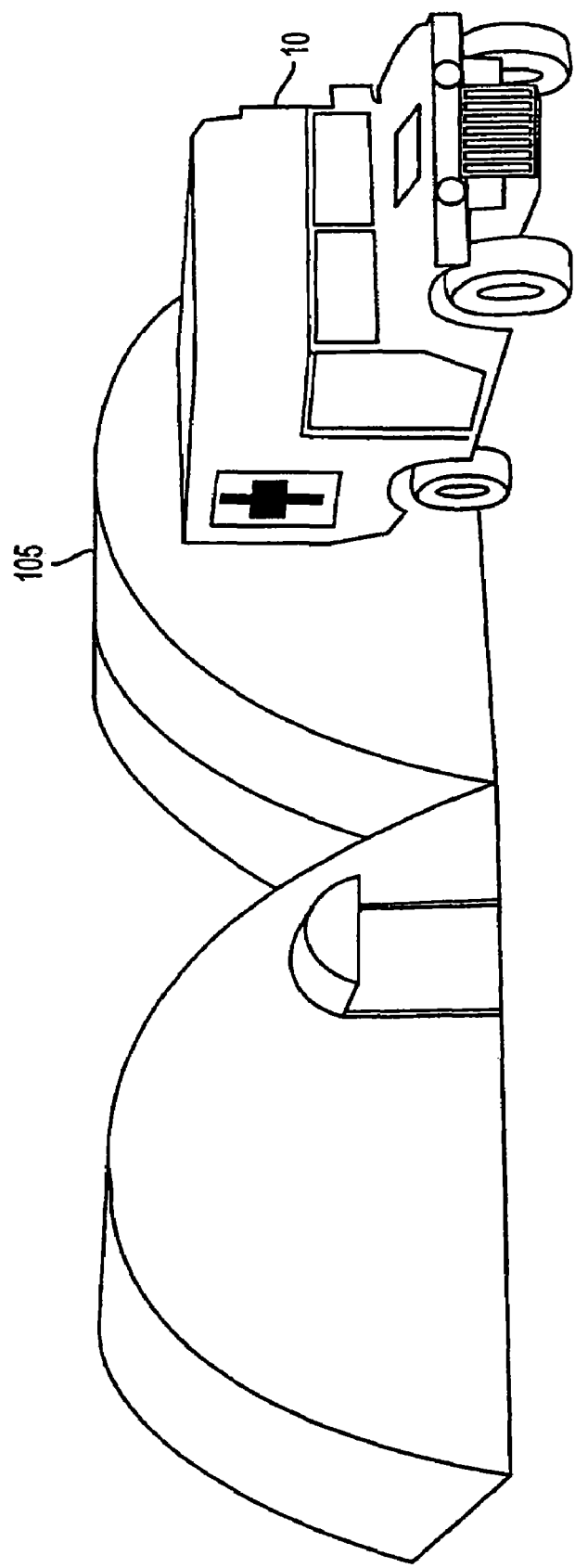
FIG. 1 provides a drawing of an embodiment of a collective protection shelter deployed from an High Mobility Multipurpose Wheeled Vehicle (HMMWV or Humvee).

It is desirable to have a controller for an isolation environment, such as that inside of a collective protection shelter, which can provide for diagnostic and prognostic capability to support condition-based maintenance (CBM) and provide a user the ability to maintain the integrity of the shelter. These controllers will generally be able to prevent the failure of components without requiring the significant logistics support required by TBM and other situational notification controllers.

In order to be able to carry out monitoring for diagnostics and prognostics purposes, the controller will generally need to perform mathematical operations, trend analysis and be able to store and manipulate sensor data autonomously or upon request from the user. As items deteriorate over time, determining what a component has been doing is often the best way to predict when it will reach a threshold where it needs to be repaired or replaced.

A collective protection shelter is a complex system which utilizes many different components. (such as, but not limited to, filtration systems, environmental controls, and power supplies). The exact design of these components is likely to vary between shelters, but often monitoring of the components can be performed either directly through onboard diagnostics, or by monitoring parameters which are generally related in a known way to a particular type of failure. For instance, air filters can be monitored for particle loading by measuring air flow on the outlet side, or the air pressure difference across the filter.

Some conditions relate directly to the environment of the shelter as a whole and can be used to recognize a problem. For instance, the shelter air may be monitored for contamination, temperature, and pressure. These situational measurements are often important to insure the overall functionality of the shelter (e.g. if the shelter is contaminated, it may be unusable), but are often unable to determine the cause of the problem (e.g. has the shelter developed a leak, is a filter failing, is an airlock not functioning correctly). In most diagnostic or prognostic operations, a single measurement is insufficient to diagnose or prognosticate failure. For this reason, input from multiple sensors generally needs to be combined, often in a variety of different ways, to provide for effective prognostic and diagnostic ability.

The controller therefore will generally need to monitor and manipulate the output from numerous sensors and subsystems related to the isolation environment. This data can then be analyzed to diagnose the current state of the shelter and prognosticate the occurrence of a failure condition. This analysis information also provides for improved current condition analysis to diagnose failure of a device and provides for an expandable interface that affords easy upgrade as new equipment becomes available (e.g. new sensors), or to be able to monitor previously unmonitored information in response to changes in the threat and/or advances in nuclear, chemical, biological or radiological detection and protection technology.

Based on the above functionality, described herein are controllers (101) which utilize processors (107) to provide for a flexible architecture that accommodates changes in sensor design, environmental control unit design, user interface design, power source design, shelter deployment and operating procedures, and can provide for complicated analysis of measurements and presentation of results in a more readily usable fashion. These processors (107) may be of any type but will generally be programmable, digital processors programmed to accept a plurality of sensor inputs, store data and perform data manipulation. While this disclosure will focus on such systems in conjunction with a Chemically and Biologically Protected Shelter System (CBPSS), it would be recognized that the controllers (101) may be used in conjunction with any type of collective protection shelter (105) or other isolation environment. Generally the controllers (101) will be used with temporary structures such as the CBPSS, Chemically Protected Deployable Medical Systems (CP DEPMEDS), Chemically Hardened Air Transportable Hospitals (CHATH), Simplified Protection Equipment (SCPE) or Joint Transportable Collective Protection Systems (JT-COPS). However, in an alternative embodiment the systems and methods can be used in conjunction with civilian versions of similar structures, or can be used in more permanent isolation environments, whether military or civilian.

In a general embodiment of a controller (101), the hardwired, electromechanical relay and diode logic currently used to control the operation of an isolation environment is removed and replaced with a programmable and an expandable architecture based on the use of a processor(s) (107) which allows for flexibility in design allowing for a wide variety of sensing, diagnostic, and prognostication tasks to be performed. It also replaces the pneumatic pressure gauges, pushbutton switches and enunciators that typically served as the user interface with an integrated switch panel and graphic display to provide for easier and more flexible user interface (103). One such display panel which may be used in an embodiment is described in U.S. Pat. No. D481,015, the entire disclosure of which is herein incorporated by reference. Generally, this control panel will be designed in conjunction with the sensors and controls appropriate to the CBPSS structure to provide for necessary sensor indications for the diagnostic and prognostic capability. The new controller (101) is preferably "plug-and-play" capable where it can simply be attached in place of the existing controller to provide the improved functionality.

The use of a programmable digital processor (107) architecture simplifies the incorporation of changes in shelter (105) operation, as well as changes in shelter (105) component design. It does so by allowing quick modification of the shelter (105) control logic, and the input/output signal maps, through changes in the software when hardware is upgraded or replaced. As the software changes are usually significantly easier to accomplish than in a hard-wired set up, the controller (101) can adapt to and use new technology quicker. Further, the flexible control structure generally allows for different sensors to be used in different environments by simply reprogramming the processor (107). This provides a system which can be customized for expected environments. This makes the system easier to maintain and use, as well as eliminating logistics costs from supplying devices which are not needed.

A programmable digital processor-based controller (101) also allows the installation of additional sensors distributed throughout the structure (105) compared to the prior designs. These sensors improve diagnosing of failures and prognosticating future system performance. The processor (107) also has computational ability to provide for calculations and manipulation of measurements from those sensors and the resultant display of the sensor component and manipulations of the sensor component. These measurements can be continuously updated to provide for prospective maintenance and for improved reliability and safety. Digital processor architecture also affords flexibility in the operational data that is presented to the end-user via the graphic display, as well as in the data format allowing different types of analysis. Finally, it offers volume, weight and cost savings over the current state of the art.

Figure 2:
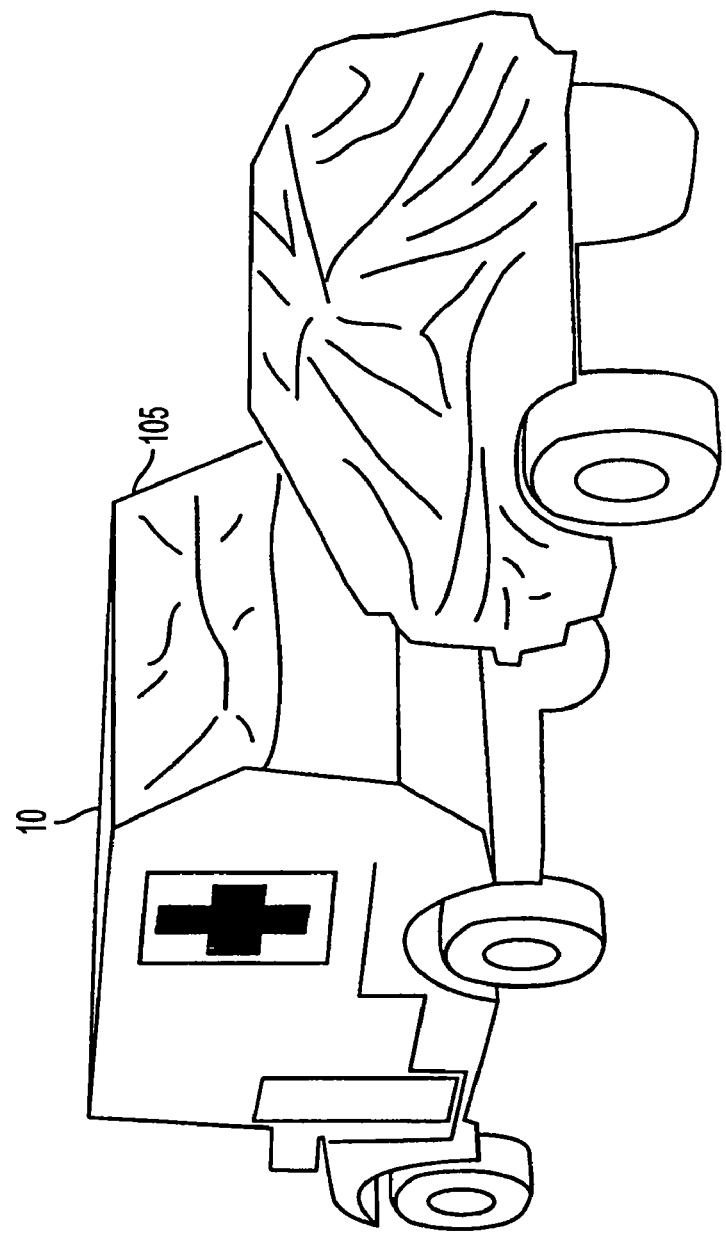
FIG. 2 shows the collective protection shelter of FIG. 1 stowed on board a Humvee.

FIGS. 1 and 2 provide for a first embodiment of a CBPSS of the type commonly used by the United States military. This structure is intended to be vehicle portable (as shown in FIG. 2) and is usually transported on a High Mobility Multipurpose Wheeled Vehicle (HMMWV or Humvee) (10). Once deployed, as it is in FIG. 1, the shelter (105) will have been inflated and will comprise a self supporting collective protection shelter. In the depicted embodiment, the shelter (105) comprises two structural "buildings" connected side-by-side. There is also an external airlock allowing access inside the shelter (105). The Humvee (10) is still attached to the shelter (105) and generally serves as a command and control center for the shelter (105) as well as a power source via its engine to run components in the shelter (105). In an embodiment, the CBPSS will also generally have an environmental control unit (ECU) (not shown) and may include an external generator.

Sensors which can provide measurements for various conditions will generally be spread through the shelter (105). These sensors will be placed in the shelter (105) in appropriate locations to provide for particular types of monitoring. The particular location of the sensor will depend on what the sensor is measuring and sensors may be located virtually anywhere. One of ordinary skill in the art would understand how to position sensors based on what they are to measure.

The controller (101), in an embodiment, comprises one or more programmable digital processors (103) and is often located on board the Humvee (10) or otherwise connected to the sensors in the shelter (105) to both provide for improved operation and to allow for more continuous sensing and computation to allow for prognostic evaluation. The controller (101) will also be connected to actuators to allow for alternation in the operation of devices used in the operation of the shelter (105). An integral user interface (103) allows for interaction of a human user with the shelter components.

The controller (101) will generally be connected to the sensors in the collective protection shelter (105) via an electrical connection comprising a shelter interface. This connection will generally be wired, but may be wireless in an alternative embodiment, via an RF link or other wireless transmission methodologies. In still another embodiment the connection may be optical, via fiber optic or infrared link. The shelter interface will generally be bi-directional and will allow the controller (101) to be connected to both sensors to allow for monitoring of the devices and/or isolation environment in the shelter (105) and to actuators to allow for the controller (101) to alter the operation of various shelter components. These may be the same device or different devices depending on operation. Block diagrams of two embodiments of a controller (101) as well as various related components including the user interface (103) and the shelter (105) are depicted generally in FIGS. 3 and 4. The embodiment of FIG. 3 utilizes a single processor (107) in the controller (101), while the embodiment of FIG. 4 uses multiple processors (107A) and (107B).

Figure 3:
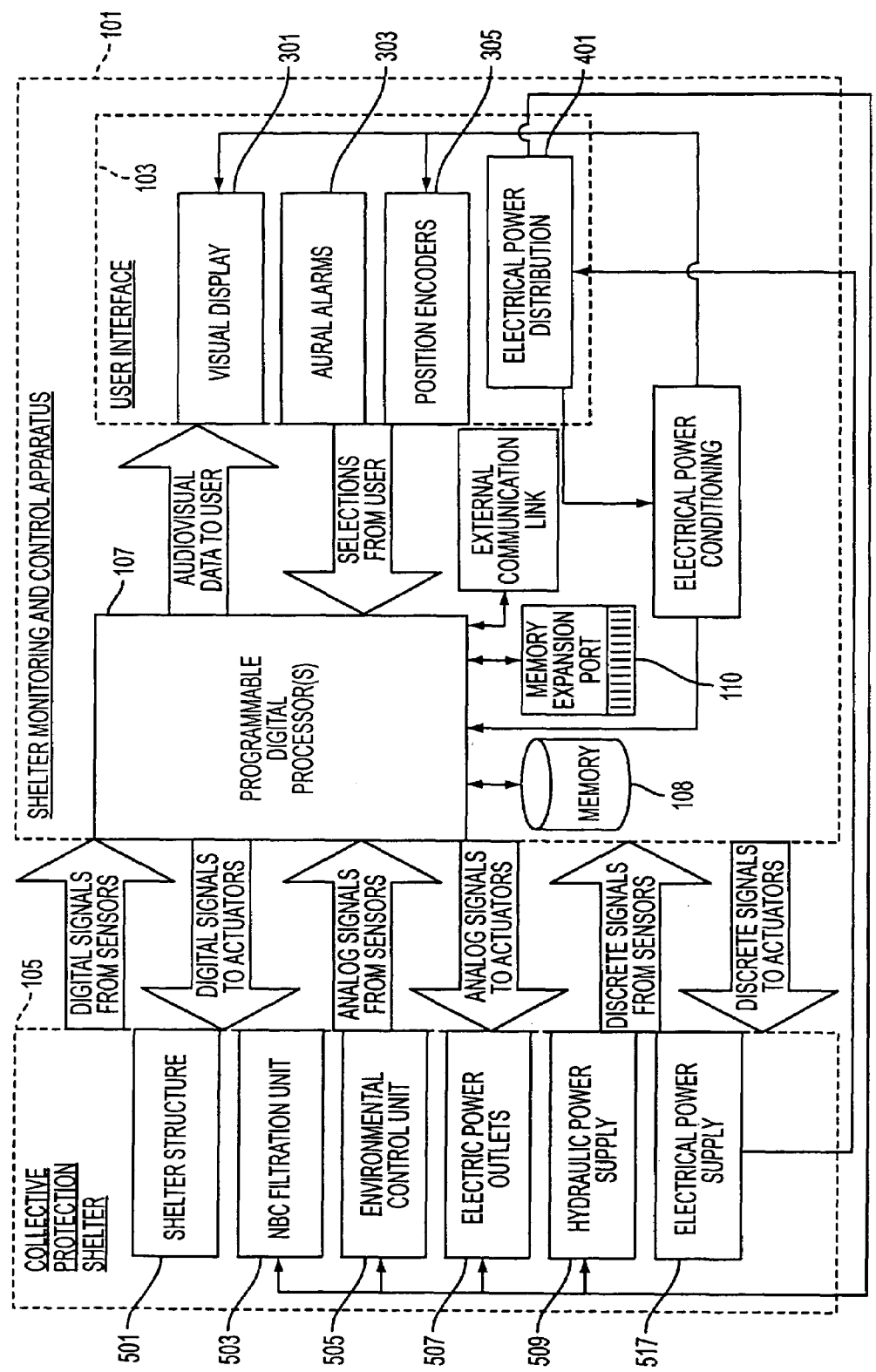
FIG. 3 provides a block diagram of an embodiment of a controller and collective protection shelter of the instant invention.

In the embodiment of FIG. 3, the controller (101) interfaces with the end-user through audiovisual means via a user interface (103) including visual (301) and audio (303) displays as well as a series of position encoders (305) through which the user can provide instructions to the controller (101). In alternative embodiments any or all of these components may be used interchangeably. The audio/visual link displays various indications of the state of the collective protection shelter (105) as well as visual and aural annunciators indicating various warning conditions. Displays include status of air filter loading, airflow, and shelter pressure relationships, but this is by no means an exhaustive list and these items do not have to be included. The status will generally be provided both by sensors added to the shelter (105) specifically for monitoring the isolation environment or by monitoring of specific components or facets of components whether using standard on-board diagnostics in those components or external sensors used in conjunction with those components.

In the embodiment of FIG. 3, there are shown a variety of sensing systems which may be used. There are included shelter structure (501) sensors, which may monitor rib pressure and shelter pressure among other things. There are also filtration unit (503) sensors. These may monitor filter air pressure, filter load, or incoming air quality among other things. There are also environmental unit (505) sensors. These may operate in conjunction with the filtration unit (503) sensors and may monitor air temperature or air quality within the shelter (105).

Electric power (507) sensors may also be included. These sensors will generally monitor electric power use by items within the shelter (105). In particular, the shelter (105) will generally have a power infrastructure provided for the operation of devices being used inside the shelter. In this way, the electrical load of devices in use in the shelter (105) may be determined. These sensors may also monitor power use by the shelter (105) itself or by the controller (101) in shelter (105) operation. Also residual power can be determined by analysis of remaining generator fuel to provide indications when fuel needs to be provided. There is finally shown a hydraulic power supply (509) sensor which can monitor hydraulic power to make sure that it is available for hydraulic operations related to operation of the shelter (105) itself or to items inside the shelter if such functionality is included.

The controller (101) will collect data from sensors in a myriad of different forms, including analog, digital and/or discrete form, depending on the types of sensors used, as is shown generally in FIG. 3. As discussed above, this data will generally relate to operation of various components of the shelter and it may also collect data on the isolation environment in the shelter as a whole. Some of this data may be discrete in nature, such as generally event data, while other data may be continuous in nature. Some sensors produce an analog signal output such as a thermistor while others produce a digital signal output such an elapsed time counter. The data will generally be provided to the user via the user interface (103) after being manipulated by the processor (107). The processor (107) may have memory (108) attached thereto for storing some or all of the data from the sensors for manipulation or later use by the user. This memory (108) may also be used to store other information useful to the controller (101) or user such as, but not limited to, maintenance data on components of the structure historical data, or electronic technical manuals on the operation and maintenance of the isolation environment, shelter, or any components thereof. In an embodiment, the memory (108) associated with the processor (107) may be expandable by the attachment of additional memory devices in an expansion port (110). These can include, but are not limited to, external hard drives, "thumb" drives, compact discs (CD), digital video disks (DVD), or other media storage devices.

Generally, the shelter interface will include necessary components to perform signal conditioning, transformation, and analog to digital conversion as necessary to ensure that the value and units of the measured parameters are understood before the data is provided to the user or used by the processor (107). These type of systems are well understood by those of ordinary skill in the art and are not depicted for simplicity.

In addition to taking in data from systems (501), (503), (505), (507), (509) and (517) in the shelter (105), the controller (101) may also output control information in analog, digital and/or discrete form to actuators in those same systems (501), (503), (505), (507), (509), and (517) to allow for alteration in the performance of components of those systems (501), (503), (505), (507), (509), and (517). These output signals may be based on particular actions taken by the user, generally by their manipulation of the position indicators (305) or may be self-initiated by the processor (107). Therefore, the systems (501), (503), (505), (507), (509), and (517) are not limited to merely passive sensing by the processor (107), but the processor (107) may have active feedback control of the systems.

Active feedback is a desirable feature as it can simplify the job of the user and help the user maintain the integrity of the environment. For example, in the filtration unit (503), a sensor may be used to determine input air pressure. When input air pressure increases to a particular threshold (indicating the filter is clogging), the indication of the air pressure may be provided to the processor (107) which may then instruct the filtration unit (503) to switch to a secondary filter. This may be performed automatically without user input and represents an embodiment of prognostic control. In this case, the processor (107) has detected that the actual condition of the filter is such to justify removal of the filter. This type of control will generally not be so simple as to relate to the output of a single measurement, as exemplified here, but the combination of numerous measurements combined with mathematical manipulation of sensor readings will be used to determine that the filter should be changed. For instance, the input air pressure, output air speed, filter load, and the existence of an unused secondary filter may all go into this decision. In the event of an action taken by the processor (107), the user may be notified, such as through visual display (301) or aural display (303), that the first filter is in need of changing.

The processor (107) need not take actions on its own, but may simply provide measurements of the sensors to the user for their decision. For instance, the air pressure indication over time may be provided to the user which can enable the user to determine from information relating to the effects of air pressure, the remaining filter life. The user can then make its own prognostication about filter life. For instance, if the user knows that the filter has been in use for a significant time but the outside air is non-hazardous, the user may elect to continue using the filter until closer to the point of actual failure (or through actual failure) to save spare filters until they are actually necessary.

In addition to simply monitoring the systems (501), (503), (505), (507), (509) and (517) during operation to provide for maintenance, the processor (107) also can provide feedback in visual, aural, or other meaningful form for any action initiated by the end-user to determine what effect the user's action had on the isolation environment. This is particularly useful where measurements may indicate a problem exists, but the measurements do not directly pin down the problem. Many sensor measurements, while being indicative of certain conditions, may not be exact indicators. Therefore, the existence of a condition which is desired to be corrected will often require diagnostic analysis to determine how the problem should best be approached and fixed.

Feedback to the user may provide indications of position in turning an air blower ON/OFF, adjusting the shelter temperature, or muting an alarm among others. These steps may relate specifically to the users' interaction with position encoders (305) designed to allow them to provide information to the processor (107). In this way, the processor (107) can act to take in and interpret commands from the user instructing the systems (501), (503), (505), (507), (509), and (517) in the shelter (105) in their desired operation and providing the user with instant feedback on the effect of alterations initiated by them or by the processor (107). Because sensor output may be provided both fairly directly to the activity of a component, and indirectly from the isolation environment as a whole, a user can see that their change has been implemented, and see if it has had the desired effect.

For example, the user may have just changed an air filter element, and the visual feedback shows the filter to be on-line, but the pressure drop across the filter element is too low. The user knows the element is new, so this could be indicative of the filter not being properly seated in place.

In an embodiment manipulation of data from the sensors by the processor (107) will attempt to help a user better maintain the integrity of the environment. Any type of mathematical manipulation may be performed such as, but not limited to, using historical data and the current state of the system to provide the user with a fault ambiguity set and measures of plausibility and support. The fault ambiguity set may be generated by any type of model or computation including, but not limited to, probability theory, Dempster-Shafer evidential reasoning theory, neural networks, or fuzzy set theory. In a still further embodiment the controller (101) would use the fault ambiguity set data produced to select and display to the user an interactive electronic technical manual (IETM). The user could then follow the instructions provided in the manual to effect further equipment troubleshooting and repair.

In order for the processor (107) to communicate with the user providing both information from sensor output and to take in user instructions, the controller (101) will generally have a user interface (103). As discussed previously, the user interface may be of the type described in U.S. Pat. No. D481,015 and previously incorporated by reference. In an embodiment, the user interface (103) may be any type of interface but will generally be of the form to allow information to be provided to the user, and to take in information from the user. In particular, a visual display (301) to the user of various pieces of information from which they can determine how operation is occurring and if maintenance needs to be performed. The visual display may include simple displays such as light emitting diodes (LED) but will also preferably include a graphical display which can allow for presentation of multiple different types of information. Such graphical display may use any type of display including, but not limited to, plasma displays, liquid crystal displays (LCDs), electroluminescent displays, vacuum tube displays, or LED displays. Aural alarms (annunciators) (303) may also be used in conjunction with visual displays (301) to provide for attention attracting methodologies in case of a potential danger situation or a situation that requires rapid attention when a user may not be directly monitoring the controller (101). The means and form of audiovisual communication may include any or all of the text, color, graphics, and sound.

To take in information from the user any type of position encoder (305) system may be used where a position encoder (305) generally refers to any system which allows for a user to indicate an input by altering the position (whether instantaneously or continuously) of an input device. In an alternative embodiment, other types of input such as speech recognition systems may be additionally or alternatively be used. In the embodiment of FIG. 3, The controller (101) senses the user's desired actions through the user's manipulation of position encoders (305). These are preferably pushbuttons, switches, or dials activated by the user to specify particular commands including activating or deactivating components in the shelter (105) such as increasing power flow to a heating element to increase temperature, or to control the processor's automatic functions. Alternatively, touchscreens, keyboards, pointing devices (such as a computer mouse), or other types of systems may be used, altering operation of devices. The user interface (103) may also provide functionality to alter available visual (301) or audio (303) displays to provide alternative information or to instruct the processor (107) to perform various computations or manipulations on stored data.

The controller (101) may use available "system" electrical power, which may be available from a connected generator or from the Humvee (10) itself to generate the electrical voltages required by the sensors and actuators in the shelter (105). In another embodiment, the controller (101) may operate off its own power source or be provided with a separate power source from the shelter. The controller (101) may also control the availability of electrical power to the shelter components regardless of from where it draws power. In the depicted embodiment, the controller (101) will actually serve as an electrical distribution system (401). By having the controller (101) serve as a distribution system (401), it also allows the controller (101) to be able to respond to various danger conditions or automatic response conditions without need for user input.

Figure 4:
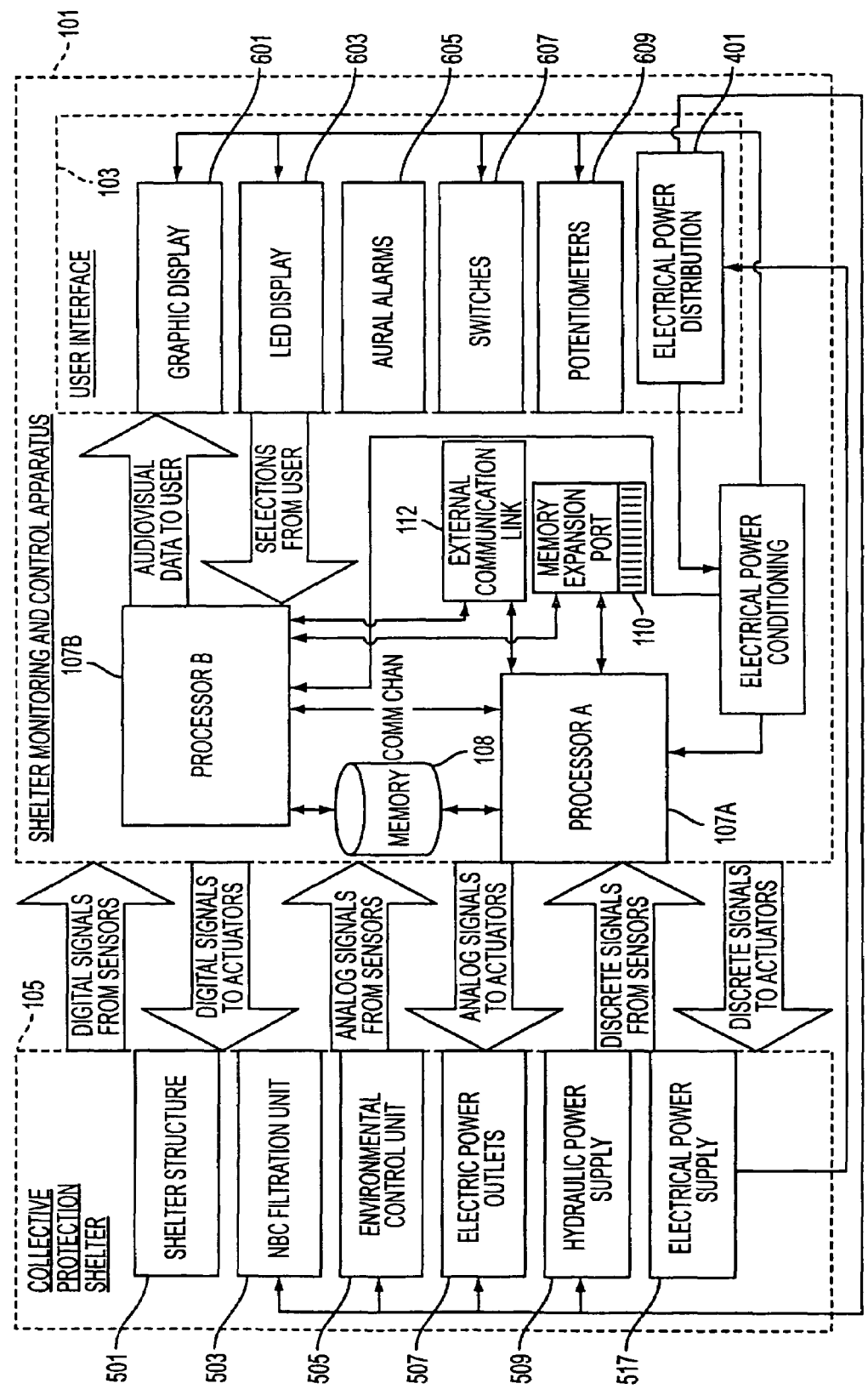
FIG. 4 provides a block diagram of another embodiment of a controller and collective protection shelter of the instant invention.

An alternative embodiment of the apparatus is shown in FIG. 4 and comprises two programmable digital processors (107A) and (107B) which share the functions of the processor (107) of the embodiment of FIG. 3. One processor (Processor A (107A)) manages the operation of the shelter (105). It collects sensor measurements (e.g., temperature, pressure, flow, and level) and operates actuators, as needed, to achieve the desired system's status (e.g., pumps, blowers, heaters, and relays). The other processor (Processor B (107B)) manages the user interface (103).

In this embodiment, the sensor and actuator systems (501), (503), (505), (507), (509), and (517) are generally similar to those in the embodiment of FIG. 3. However, their control is separated from control of the user interface (103). The two processors (107A) and (107B) exchange data through a communications channel which may be hard-wired or wireless depending on the embodiment and may be independent or part of a greater network. A set of messages is used to communicate the system's status and the user actions. The user interface (103) of this embodiment is a little more complex and includes a switch panel (607) as well as a light emitting diode display (603) and a graphic display (601) to communicate the system's status and display text messages. One or more rotary switches as well as pushbuttons or other switches may be included in the switch panel (607). There may also be included one or more potentiometers (609) to establish process control set points, and one or more audible annunciators (605) to alert the user. This embodiment also includes a distribution system (401) to control AC and/or DC power distribution in a similar manner to the embodiment of FIG. 3. In the embodiment of FIG. 4, the user interface (103) may be more complex as the additional processing power can provide for more complex output and can handle more complex input.

In the embodiment of FIG. 4, the user may be remotely located from the shelter (105) with communication being provided from the controller (101) to the shelter (105) via any type of data transmission. This type of arrangement may be particularly desirable if there are a large number of shelters (105) being monitored. Instead of each shelter (105) requiring an individual user interface and user to operate it, a single user may control multiple shelters (105) simultaneously. In this way, if a new threat is detected requiring all the shelters (105) to carry out the same action, a single user can carry out all the actions simultaneously, and monitor each shelter (105) simultaneously to insure compliance. This provides for improved efficiency. Still further, the user can compare operational measurements of different shelters (105) against each other which can improve prognostication ability. Such a remote system also provides for improved efficiency.

In an additional embodiment, various components and relationships could be altered without changing the functionality. An alternate embodiment incorporates additional mode control switches and potentiometers into the user interface (103). Still another embodiment uses mechanical and/or optical encoders in lieu of the potentiometers (609).

In another embodiment, the two processor general layout of FIG. 4 can be used but Processor A (107A) can perform the calculations in addition to controlling the shelter (105) operation while Processor B (107B) controls only the user interface. Alternatively, the two processors (107A) and (107B) share control of the operation of the shelter (105) and the interface to the end-user, as well as perform the calculations.

Another alternate embodiment is to have Processor B (107B) control the user interface and perform the calculations, and have multiple processors control the operation of the shelter (105). There would preferably be one processor for each system (501), (503), (505), (507), (509), and (517) in the shelter (105) or any combination of subsystems of the shelter (105).

The controller (101) provides for benefits outside of simply being able to provide more detailed information to the user for purposes of prognostication. The processor (107) is preferably programmable, and therefore the type of systems (501), (503), (505), (507), (509), and (517) present may be changed readily without having to rewire the controller (101). The processor (107) can simply be reprogrammed to recognize a different type of input. Further, the processor (107) can be designed to accept input only when such systems are present. For instance, the shelter (105) may include an air monitor system to detect certain chemical contaminants. The processor may be designed to accept output from any type of air sensor, but the air sensor may be selected based on certain expected contaminants. In this way, the system can have the increased functionality of being able to be used in a plurality of different environments using different sensors without having to have unnecessary functionality included in the form of unneeded sensors. Further, as specialized controllers are not used in different situations, maintenance is generally simplified with more standardized parts and construction.

The system also has decreased volume and weight over systems utilizing hardwired systems, even for the same or increased functionality. Volume and weight savings can both improve storage capability on board the Humvee (10) allowing for transport of additional materials for use in the shelter (105) which allows the shelter (105) to be better equipped and more self-sustaining.

With regards to maintenance, the improved availability of information, and the open computation strength of the processor (107) to produce trend data or perform calculation(s) makes the controller more effective at prognosticating and diagnosing. The controller (101) can also be equipped with a remote communication link (112) to allow still further functionality by providing access to material outside of the controller (101). The system can provide Internet connectivity to allow support for web pages or remotely stored information or for accessing other components external to the controller (101) or isolation environment such as other computers or maintenance equipment. The communication link (112) may be of any type including wired connections or wireless connections of any type. In this way, a library of maintenance manuals or other materials may be readily available without need to have and store these materials. This provides for both the ability to access materials to diagnose an unknown problem, and can also provide for remote monitoring of the shelter (105) by other remote systems to provide for redundancy or information distribution.

In a particular embodiment the remote communication link (112) allows the user to order replacement parts directly from a supply center as soon as the controller (101) prognostic calculations determine that a replacement is needed. An embodiment of such an ordering system is described in U.S. patent application Ser. No. 10/285,349, the entire disclosure of which is herein incorporated by reference. This would further reduce the need to carry as many spare components, which permits additional mission equipment to be carried on-board the Humvee (10).

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A controller for a shelter including an isolation environment, the controller comprising:
   a first processor;
   an interface connected to said first processor and enabling, said first processor to accept signals from a sensor, and deliver signals to an actuator;
   a user interface connected to said first processor, said user interface being able to take in instructions and display information; and
   a communication link connected to said first processor for accessing material external to said controller;
   wherein,
   said first processor uses said signals from said sensor and said instructions to provide, via said user interface, said information, said information relating to the operation of a plurality of components, said information being used to ensure the integrity of said isolation environment, and
   said first processor generates said signals to said actuators based on said signals received from said sensors and said instructions.

2. The controller of claim 1 further comprising a second processor.

3. The controller of claim 2 wherein said second processor is similar to said first processor and assumes some of the functions of said first processor.

4. The controller of claim 2 wherein said second processor is located physically remote from said first processor and is in communication with said first processor.

5. The controller of claim 1 wherein said shelter is inflatable.

6. The controller of claim 5 wherein said shelter is a Chemically and Biologically Protected Shelter System (CBPSS).

7. The controller of claim 1 wherein said first processor is a programmable digital processor.

8. The controller of claim 7 wherein said controller further includes a memory for program and data storage.

9. The controller of claim 8 wherein said first processor is programmed to store said signals from said sensor in said memory.

10. The controller of claim 9 wherein said first processor produces as said information, trend information about said stored signals by mathematically operating upon said stored signals.

11. The controller of claim 9 wherein said first processor produces as said information a diagnosis of the current state of at least one of said shelter components by mathematically operating upon said stored signals.

12. The controller of claim 9 wherein said first processor produces as said information a prognosis of the state of at least one of said shelter components by mathematically operating upon said stored signals.

13. The controller of claim 9 wherein said first processor is programmed to store maintenance data on at least one of said shelter components in said memory.

14. The controller of claim 13 wherein said information includes a fault ambiguity set generated by said first processor mathematically operating upon said stored maintenance data and said stored signals.

15. The controller of claim 14 wherein said mathematical operation uses probability theory.

16. The controller of claim 14 wherein said mathematical operation uses evidential reasoning.

17. The controller of claim 14 wherein said mathematical operation uses neural networks.

18. The controller of claim 14 wherein the mathematical operation uses fuzzy set theory.

19. The controller of claim 8 wherein said first processor is programmed to store interactive electronic technical manuals on the operation and maintenance of said shelter in said data storage.

20. The controller of claim 8 wherein said memory is expandable.

21. The controller of claim 1 wherein said communication link can access a system for ordering replacement parts directly from a supply center.

22. The controller of claim 1 wherein said signals from said sensor comprise analog signals.

23. The controller of claim I wherein said signals from said sensor comprise digital signals.

24. The controller of claim 1 wherein said signals from said sensor comprise discrete signals.

25. The controller of claim 1 wherein said signals to said actuator comprise analog signals.

26. The controller of claim 1 wherein said signals to said actuator comprise digital signals.

27. The controller of claim 1 wherein said signals to said actuator comprise discrete signals.

28. The controller of claim 1 wherein said user interface includes switches and potentiometers.

29. The controller of claim 1 wherein said user interface includes a touchscreen.

30. The controller of claim 1 wherein said user interface includes a keyboard.

31. The controller of claim 1 wherein said user interface includes a pointing device.

32. The controller of claim 1 wherein said user interface includes visual and aural annunciators.

33. The controller of claim 1 wherein said user interface includes a graphical display.

34. The controller of claim 33 wherein said graphical display includes at least one of: a plasma display, a liquid crystal display, an electroluminescent display, a vacuum tube display, and a light emitting diode display.

35. The controller of claim 1 wherein said communication link is wired.

36. The controller of claim 1 wherein said communication link is wireless.

37. The controller of claim 1 wherein said communication link provides access to the Internet.

38. The controller of claim 1 wherein said communication link provides access to a remote computer.

39. The controller of claim 1 wherein said communication link provides access to a remote piece of maintenance equipment.

40. A controller for a shelter including an isolation environment, the controller comprising:
   a processor;
   a plurality of actuators connected to said processor;
   an interface connected to said processor; and
   a plurality of sensors connected to said processor;
   wherein said processor accepts input signals from said sensors, and delivers output signals to said actuators;
   wherein said processor mathematically manipulates said input signals to produce information about the current and future operation of said shelter;
   wherein said processor provides a user with said information through said user interface;
   wherein said processor takes in instructions from a user through said user interface; and
   wherein said processor generates said output signals based on said input signals and said instructions from said user.

41. A controller for a shelter, including an isolation environment, the controller comprising:
   at least two processors;
   a user interface;
   a plurality of actuators; and
   a plurality of sensors;
   wherein one of said processors accepts input signals from said sensors and delivers output signals to said actuators;
   wherein at least one of said processors mathematically manipulates said input signals to produce information about the current and future operation of said shelter;
   wherein at least one of said processors provides a user with said information through said user interface;
   wherein at least one of said processors takes in instructions through said user interface;
   wherein at least one of said processors generates said output signals based on said input signals and said instruction; and
   wherein two of said processors exchange data with each other via a communications channel.

42. The controller of claim 41 wherein said communications channel is wired.

43. The controller of claim 41 wherein said communications channel is wireless.

44. The controller of claim 41 wherein said at least one of said processors mathematically manipulating said input signals is physically remote from said at least one of said processors providing said user said information.

* * * * *